(12) United States Patent
Chen et al.

(10) Patent No.: US 11,312,113 B2
(45) Date of Patent: Apr. 26, 2022

(54) MULTILAYER LAMINATE FILM ASSEMBLY AND STANDING POUCH

(71) Applicant: QuinLyte Holding B.V, Sittard (NL)

(72) Inventors: Hao Chen, Sittard (NL); Qing Sun, Sittard (NL)

(73) Assignee: QUINLYTE HOLDING B.V., Sittard (NL)

( * ) Notice: Subject to any disclaimer, the term of this patent is extended or adjusted under 35 U.S.C. 154(b) by 176 days.

(21) Appl. No.: 16/042,418

(22) Filed: Jul. 23, 2018

(65) Prior Publication Data

US 2019/0022988 A1 Jan. 24, 2019

(30) Foreign Application Priority Data

Jul. 24, 2017 (NL) ...................................... 2019329

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 27/30* (2013.01); *B32B 27/306* (2013.01); *B32B 27/32* (2013.01); *B32B 27/34* (2013.01); *B32B 27/36* (2013.01); *B65D 75/008* (2013.01); *B32B 2250/40* (2013.01); *B32B 2250/42* (2013.01); *B32B 2255/10* (2013.01); *B32B 2307/518* (2013.01); *B32B 2307/7244* (2013.01); *B32B 2307/7246* (2013.01); *B32B 2307/7248* (2013.01); *B32B 2307/7265* (2013.01); *B32B 2323/04* (2013.01);
(Continued)

(58) Field of Classification Search
None
See application file for complete search history.

(56) References Cited

U.S. PATENT DOCUMENTS

| 4,766,018 A * | 8/1988 | Hinrichsen ............. B32B 27/32 |
| | | 428/35.9 |
| 2005/0255268 A1* | 11/2005 | Burki ........................ B32B 7/02 |
| | | 428/35.7 |

(Continued)

FOREIGN PATENT DOCUMENTS

| WO | 2007/047133 A1 | 4/2007 |
| WO | 2007/060086 A1 | 5/2007 |

(Continued)

*Primary Examiner* — Ramsey Zacharia
(74) *Attorney, Agent, or Firm* — Shumaker, Loop & Kendrick, LLP (57) ABSTRACT

A multilayer laminate film assembly is provided, which includes at least two multilayer substrate films, each substrate film having at least a first outer layer and a second outer layer, and wherein the at least two multilayer substrate films each include at least two layers of a different class of material. In the laminate film assembly, the at least two substrate films are laminated together, preferably wherein the class of material of the first outer layer differs from the class of material of the second outer layer. The multilayer substrate films are from the same type of substrate. A standing pouch is further provided which includes a front panel, a back panel, and a bottom panel, wherein all panels are from the multilayer laminate film.

14 Claims, 5 Drawing Sheets

Substrates

Multilayer laminate film assembly (51) Int. Cl.
    *B32B 27/30*     (2006.01)
    *B32B 27/32*     (2006.01)
    *B32B 27/34*     (2006.01)
    *B32B 27/36*     (2006.01)
    *B65D 75/00*     (2006.01)
    *B32B 27/00*     (2006.01)
    *B65D 30/08*     (2006.01)
    *B65D 30/16*     (2006.01)

(52) U.S. Cl.
    CPC ....... *B32B 2323/10* (2013.01); *B32B 2329/04* (2013.01); *B32B 2377/00* (2013.01); *B32B 2439/06* (2013.01); *B32B 2439/70* (2013.01)

(56) References Cited

U.S. PATENT DOCUMENTS

| | | | |
|---|---|---|---|
| 2009/0047525 A1* | 2/2009 | Tilton | B32B 27/20 |
| | | | 428/441 |
| 2017/0121082 A1* | 5/2017 | Tiwari | B65D 75/008 |

FOREIGN PATENT DOCUMENTS

| | | |
|---|---|---|
| WO | 2012/003041 A1 | 1/2012 |
| WO | 2016/128865 A1 | 8/2016 |

\* cited by examiner

Substrates        Multilayer laminate film assembly

FIG. 1

Substrates        Multilayer film assembly

FIG. 6 stronger seam for stand up pouches

MULTILAYER LAMINATE FILM ASSEMBLY AND STANDING POUCH

CROSS REFERENCE TO RELATED APPLICATION

This application claims Convention priority based on Netherlands patent application 2019329 filed Jul. 24, 2017.

TECHNICAL FIELD

The present invention relates to a multilayer laminate film assembly. The present invention also relates to a standing pouch, also called stand-up pouch or SUP.

BACKGROUND

Flexible packaging, especially stand-up pouch (or "SUP") is one of the fastest growing packaging concepts replacing rigid packaging such as jars, cans and bottles. Consumers perceive a SUP as environmental friendly because less packaging materials are used. In addition, consumers perceive a product packed in an SUP as having a higher quality. It should be noted however that the currently used SUPs are not as sustainable as they are perceived. A SUP is prepared from multilayer films. To fulfil various demands and requirements, films for SUPs have to use various materials to comply with all of these needs; hence many different multilayer laminate assemblies are used. The complexity of these multilayer laminates film assemblies used for SUP has a disadvantage in that it slows down new packaging development, limits the room for (productivity and performance) optimization and makes it difficult if not impossible to recycle after use.

Since SUP must be able to stand upright on retail shelves, according to the prior art this performance request is achieved by increasing the film thickness in order to increase bending stiffness. This solution has the disadvantage that it increases the weight of the package and as a consequence increases the amount of waste after consumption of the packaging content. According to the prior art this demand—upright standing—may also be achieved by using highly stiff materials such as BOPP in the SUP. This solution has however the disadvantage that the packaging shows brittle touch, a cheap feeling and an annoying noise when handled which are not appreciated by many consumers.

There is thus a need for novel multilaminate films that are able to provide SUPs that are able to stand up without the need for increasing the thickness/amount of material and without the disadvantage of the brittle touch, cheap feeling and/or annoying noise.

SUMMARY

It is an object of the present invention to provide a multilayer laminate film assembly. It is another object to provide a multilayer laminate film assembly made from multiple multifunctional substrate films. It is a further object of the present invention to laminate several substrate films in a way that maximizes the flexibility of adding additional functions. It is another object of the present invention to provide a multilayer laminate film with improved properties, such as barrier and mechanical properties, for standing pouches. It is a further object of the present invention to provide stronger seams to SUPs so that they can stand up by using thinner materials. It is further object of the present invention to provide a multilayer laminate film having reduced complexity of the variety of layer structures, improving the sustainability elements such as recyclability and without over compromising on functionality.

One or more of these objects are achieved by a multilayer laminate film assembly as defined in the claims. The present laminate film assembly has as one or more advantages that may be standardized, versatile and recyclable. One or more of these objects are achieved by standing pouches as defined in the claims.

The multilayer laminate film assembly according to the present invention provides a modular approach, improved recyclability and enhanced performance. Different types of pouches require different needs for films. By the modular approach according to the present invention the substrate films may be considered as standardized modules that may be combined according to need. Hence the present invention can contribute to standardization of the pouch film production. Because of this modular approach and because in an embodiment the several substrate films may be of the same substrate type, this makes the pouch potentially recyclable. In addition, it can more efficiently use the materials and enhance the overall properties of multilayer laminate film assembly. Consequently, this invention can also increase speed and efficiency of the film assembly process for a broad range of packaging and non-packaging applications.

List of Definitions

The following definitions are used in the present description and claims to define the stated subject matter. Other terms not cited below are meant to have the generally accepted meaning in the field.

Multilayer laminate film assembly as used in the present description means a film that is suitable for the preparation of standing pouches that is an assembly of at least two substrate films laminated together.

Multilayer substrate films as used in the present description means a film that is used as a substrate for the laminate film assembly, said substrate film comprising at least two layers (multilayer). At least two substrate films are laminated together to form the laminate film assembly.

First and second outer layer of substrate films as used in the present description means both outer layers of the multilayer substrate films. In case the substrate film consists of two layers, both of these two layers are outer layers, being the first and second outer layer. When the substrate films comprises three or more layer, the additional layer(s) are in between the first and second outer layers.

Outer layers of the laminate film assembly as used in the present description means the outermost layers of the laminate film assembly which are the first and/or second outer layers of the substrate film depending on the number of substrate films used. When the laminate film assembly consists of two substrate films, in a first embodiment the first outer layer (A) of the first substrate film and the first outer layer (A) of the second substrate film form the outer layers of the laminate film assembly (For example A..BB..A; the .. denoting either no addition layer, or one or more additional layers). In a second embodiment, the first outer layer (A) of a first substrate film and the second outer layer (B) of the second substrate film form the outer layers of the laminate film assembly (for example A..BA..B). In a third embodiment, the second outer layer (B) of a first substrate film and the second outer layer (B) of the second substrate film form the outer layers of the laminate film assembly (for example B..AA..B). When the laminate film assembly consists of three substrate films, the first outer layer of the first substrate film and the first outer layer of the third substrate film form the outer layers of the laminate film assembly, and so on.

Coating as used in the present description means a layer of coating material provided on a first and/or second outer layer of a substrate film. It should be noted that the coating is not considered an additional layer.

Printing as used in the present description means a printed image and/or text provided on a first and/or second outer layer of a substrate film. It should be noted that the printing is not considered an additional layer.

Substrate film as used in the present description means that there are at least two classes of materials in the film. With the statement "wherein the at least two multilayer substrate films each comprise at least two layers of a different class of material" is meant that each of the substrate films has a least two layers that are of different classes of materials, meaning a layer of a first class of material and a layer of a second class of material. This difference in material class layers may be symmetrical or asymmetrical.

Symmetrical substrate film as used in the present description means that the class of material of the first outer layer is the same as the class of material of the second outer layer and that there is at least one additional layer of a different class of material.

Asymmetrical substrate film as used in the present description means that the class of material of the first outer layer differs from the class of material of the second outer layer.

Thermoplastic polymer as used in the present description is a polymeric material that is mouldable above a certain temperature and that solidifies below a certain temperature.

Functional layer as used in the present description means a layer that provides a certain function to the laminate film assembly. Examples of such functions are barrier functions, such as barrier against moisture, barrier against oxygen, barrier against gas or mechanical functions, such as tensile strength, tensile modulus, puncture resistance, impact resistance and tear resistance etc.

Sealing layer as used in the present description means the layer of the laminate film assembly that is used to form the seal in the flexible packaging such as SUP, in other words the outer layer that is sealed to another outer layer of the laminate film assembly to form the pouch.

Sealing materials as used in the present description means materials that have a low melting temperature and that may be used to form sealing layers. These sealing layers may be used to form sealing seams for flexible packaging.

Tie resins as used in the present description means resins that are applied in co-extrusion, where chemical bonding is created between two layers of molten materials. These types of resins may be used for making co-extruded substrate films.

Lamination adhesives as used in the present description means adhesives that are applied during film lamination, where physical bonding is created between two layers of non-molten, solid materials. These types of adhesives may be used to bond two or more substrate films into a multilayer film assembly.

Class of material as used in the present description means for a class of polymers. In a certain class of material/polymer several different polymers may be present. In case a certain layer is for example a first member of a certain class of material and another layers is of a second member of the same class of material, these layers are considered to be of the same class of material, even though two different polymers are used.

Examples of this that are suitable for use in the present description are the following. It should be noted that for each of these classes/members the polymers cited may be mixed with e.g. additives, fillers and the like that are known to a person skilled in the art.

the class of polyethylene material; members of this class are for example HDPE, MDPE, LDPE, VLDPE, LLDPE, non-polar ethylene copolymers such as metallocene catalyzed polyethylene (PE-MC), polyethylene with multimodal molecular weight distribution, cyclic olefin copolymers (COC), polar ethylene copolymers such as ethylene vinyl acetate (EVA) and Ethylene/acrylic acid copolymers (EAA), ionized ethylene and methacrylic acid copolymer (Surlyn® ionomer) and PE based grafted tie resins such as anhydride grafted polyethylene (PE-g-MA), and bio-based polyethylenes.

the class of polypropylenes materials; members of this class are for example homopolymers such as isotactic polypropylene (PP-it), atactic polypropylene (PP-at); metallocene catalysed syndiotactic polypropylene (PP-st); block and random copolymers such as polypropylene/polyethylene copolymers, and PP or PP copolymer based tie resins such as anhydride grafted polypropylene (PP-g-MA), and bio-based polypropylenes.

the class of polyamide materials; members of this class are for example aliphatic polyamide homopolymers, such as PA-6, PA-6,6, PA-4,6, PA-4,10, PA-6,10, PA-10,10, PA-6,12, PA-12, and their copolymers, such as but not limited to PA-6/6,6, PA6,6/6 and PA6/12, semi- and aromatic polyamide homopolymers and copolymers such as but not limited to PA-6T, PA-6I,6T, PA6/6T, PA-MXD6.

the class of ethylene vinyl alcohols (EvOH) materials; members of this class are EvOH with 20%-50% ethylene content. From chemical composition point of view, EvOH as the non-polar ethylene copolymer belongs to the class of polyethylene. However, from barrier and mechanical property point of view, EvOH completely different from the rest of the polyethylene family. In the present invention, we define EvOH as an independent material class.

the class of polyester materials; members of this class are for example polyethyleneterephtalate (PET), polybutylene terephthalate (PBT), thermoplastic elastomer (TPE) copolymers.

the class of lamination adhesives; members of this class are specifically served as adhesives during film lamination, for example but not limited to, polyurethane dispersions, acrylic emulsion based adhesives, acrylic solvent based adhesives, water-based polyvinyl alcohol, and high solids silicone solvent preferably for dry bonding; and modified polyesters preferably for hot-melt bonding; (meth)acrylate monomers and oligomers and aliphatic urethane acrylates preferably for UV/electron beam bonding. There are two exceptions to this classification. The first exception is polyethylene materials such as EVA and other modified polyethylenes used in dry bonding or hot melting. These materials are according to the present invention classified in the material class of polyethylene. The second exception is that when materials such as polyethylenes, polypropylenes, ethylene vinyl alcohols, polyesters or polyamides are used for extrusion coating lamination, according to the present invention, these materials are classified in their defined respective material classes.

When two layers are of the same class of material, this means for example that two different polyethylene materials may be used, such as a first outer layer of a first substrate film is of HPDE and a first outer layer of a second substrate film is of LPDE. These two first outer layers are of the same class of materials Polyolefin as used in the present description means a polymer comprising olefins, being propylene and/or ethylene. In other words, the classes of polypropylene materials or the class of polyethylene materials.

Type of substrate as used in present description means that a substrate film uses certain combination of classes of material with certain weight percentage. When two substrate films are of the same type of substrate, this means they use the same combination of classes of material. And for each class of material, these two films have the same range of total weight percentage. Same range means the tolerance of difference within 30%, preferably within 20%, more preferably within 10%. For example the two following substrate films are of the same type of substrate: first substrate film having three layers, each having a thickness of 30 micrometers, the first outer layer (A) being of a certain grade of polypropylene, the middle layer (M) being of EVOH, the second outer layer (B) being of polyamide copolymer (PA-6/6,6); the second substrate film having 6 layers; having in two 10 micrometer layers of two different types of PP, having two 10 micrometer layers of two different types of polyamide (PA-6 and PA-6/6,6) and having one single layer of 20 micrometer of EVOH.

Films classified as the same type of substrate can still be different in terms of number of layers, class of material used per layer, as well as thickness per layer.

Co-extruded film as used in present description means thin layers of (different) classes of materials layered together by co-extrusion. In this manner, a multiple of functions can be combined in a single film such as heat sealing capabilities, barrier properties, mechanical strengths, puncture resistances, cold resistance, capabilities to be printed and coated etc.

Biaxially oriented film as used in present description means films that are either planar or blown stretched at both machine and transverse directions by more than 30%, preferably more than 100%, more preferably more than 200%. Films are annealed after stretching thus have dimensional stability at elevated temperatures. Compared with non-stretched film, biaxially oriented film has higher tensile strength, toughness, heat stability, tear initiation resistance, and barrier. Biaxially oriented polypropylene films are usually denoted BOPP.

Thermo-sealable polymer as used in the present description means a polymer that is able to form a seal with another or the same polymer by means of heating and subsequent cooling. It is also called heat sealable polymer. Heat sealing as used in the present description means the sealing of seams of an object, e.g. a standing pouch by heating and sealing part (preferably edges) of a laminate film assembly to for seams.

Standing pouch as used in the present description a pouch that is able to stand upright. Other names that are used for this are stand-up pouch or SUP, all having the same meaning in the present description.

Interface as used in the present description means the surface of contact of two adjacent layers of different classes of materials in the substrate film or in the multilayer film assembly. Between each set of two layers, there is an interface. For example, for a three layer coextruded PP/PP-g-MA/PA substrate film, there is one interface between PP-g-MA and PA, since PP and PP-g-MA are of the same class; for a 3 three layer coextruded PP/PP/PP substrate film, there is no interface; for a cast PA laminated to cast PE film (PA/AD/PE), there are two interfaces, one between PA and AD (ADhesive) and one between AD and PE.

Sealing as used in the present description means the forming of a sealing seam.

Sealing seams as used in the present description a seam that seals at least one side of a pouch.

Hermetic sealing seams are sealing seams having a high sealing strength that is sufficient for hermetically sealing an opening in a pouch to allow gas and/or liquid to be kept inside of the pouch.

Lamination as used in the present invention means any technique to bond together at least two substrate films. An example of lamination that may be used in the present invention is adhesive lamination, for example dry bonding. Another example of lamination that may be used in the present invention is hot melt adhesion bonding. Yet other examples of lamination that may be used in the present invention are UV/Electron-Beam bonding technologies. Yet another example of lamination that may be used in the present invention extrusion lamination.

Dry bonding as used in the present invention means a process wherein a liquid adhesive is coated on a substrate film, then dried (e.g. with heat and/or an air flow), and then laminated to another substrate film using e.g. a heated compression nip. Examples of adhesives that are suitable for use in a dry bonding technique according to the present invention including but not limited to polyurethane dispersions, acrylic emulsion based adhesives, acrylic solvent based adhesives, water-based polyvinyl alcohol, ethylene vinyl acetate copolymers, high solids silicone solvent.

Hot melt adhesion bonding as used in the present invention means a process wherein a low viscosity hot melt adhesive is applied to one or both substrate films which are then laminated together using e.g. a heated compression nip. Examples of hot melt adhesives that are suitable for use in a hot melt bonding technique according to the present invention including but not limited to ethylene vinyl acetate, modified polyolefins and polyesters.

UV/E-beam bonding as used in the present invention means a process wherein an adhesives is (directly) coated on the surface of a substrate film, nipped to a second substrate film and subsequently cured at a certain line speed using UV lamps or Electron Beaming to initiate immediate tack and bond strength. Examples of UV/E-beam adhesives that are suitable for use in a UV/E-beam bonding technique according to the present invention including but not limited to (meth)acrylate monomers and oligomers and aliphatic urethane acrylates.

Extrusion lamination as used in the present invention means a process wherein an adhesive resin is melted and formed into a thin hot film, which is immediately coated onto a substrate film (preferably conveyed and flat). The coated substrate film (still hot) then passes between a set of counter-rotating rolls, which press the coated substrate film onto another substrate film to ensure complete contact and adhesion. Examples of adhesives that are suitable for use in extrusion lamination according to the present invention including but not limited to polypropylenes, polyethylenes, polyamides, and polyesters.

Symmetrical lamination as used in the present description means that the first outer layers of the two same type of substrate films are laminated together, such as A.BB..A or B..AA..B. Asymmetrical lamination as used in the present description means that the first outer layer of the substrate film is laminated to the second outer layer of the same type of substrate film, such as A..BA..B.

Wherein the two outer layers are made from the same class of material and the two substrate films have the same range of thickness. Same range means the tolerance of difference within 30%, preferably within 20%, more preferably within 10%.

Nylon 6 as used in the present description is also known is polycaprolactam, polyamide 6, or PA-6, or by its IUPAC name poly(haxano-6-lactam). Nylon 6 is not a condensation polymer, but instead is formed by ring-opening polymerization.

Cast extrusion film line as used in the present description means a process that typically involves the use of coextrusion, which is a simultaneous extrusion of two or more materials form a single die to form a multi-layered film. In the cast film extrusion process, the molten polymer travels through a flat die system to adapt its final flat film shape. The die system is formed by the die and feedblock (if the process requires coextrusion) or simply the die, if the process is that of mono-layer extrusion. The process starts with the feeding of plastic resins by means of a gravimetric feeding system to one or more extruders. The materials are then melted and mixed by the extruders, filtered and fed to the die system. Immediately after exiting the die, the molten curtain enters the cooling unit where its temperature is lowered with a water cooled chill roll to "freeze" the film. The number of layers, their position in the coextrudate and their individual thickness are all variables that change depending on the particular application of the film.

Bending stiffness, stiffness or stiff as used in the present description is the ability of a thin material such as films for packaging to stay straight and flat without wrinkle against gravity and/or (bending) deformation. It can be easily judged by observation, an experienced engineer may use modulus such elastic modulus, flexural modulus, or 1% secant modulus of the material to quantitatively compare and predict the bending stiffness.

Rigidity for material scientists as used in the present description cannot be directly measured, but there is a formula to describe which factors can influence the rigidity (D) of a single layer thin film.

$$D = \frac{E\,t^3}{12(1-v)}$$

where E is the tensile, elastic or 1% secant modulus. t is the thickness of the film and v is the Poissons ratio (for film it about 0.3-0.4). According to this formula, since the thickness of film has a cubic effect to the rigidity, and modulus is indifferent to thickness, by increasing the number of layers and reducing the thickness of each layer in a multi-layer film could effectively reduce the rigidity while keep the modulus (bending stiffness) of the film.

Rigidity for consumers as used in the present description is the subjective judgement when people touch, grab, squeeze or twist a flexible packaging. The term close to rigidity is brittleness, while the opposite of rigidity is softness and flexibility.

BRIEF DESCRIPTION OF DRAWINGS

The present invention is described hereinafter with reference to the accompanying drawings in which embodiments of the present invention are shown and in which like reference numbers indicate the same or similar elements.

DESCRIPTION OF EMBODIMENTS AND DRAWINGS

In an embodiment, the multilayer laminate film assembly comprises two substrate films. In an embodiment, the multilayer laminate film assembly consists of two substrate films. In an embodiment, both substrate films are from the same type of substrate. In an embodiment, the multilaminate film assembly consists of three substrate films, preferably all substrate films are from the same type of substrate. In an embodiment, the multilaminate film assembly consists of four substrate films, preferably all substrate films are from the same type of substrate.

It should be noted that in the multilayer laminate film assembly the separate layers and the number of layers may not be visible. However, their layer structures can be identified and layer thickness can be measured via the cross-section analysis using optical microscopy and the material class of each layer can be determined by using Infrared Microscope (FTIR).

In an embodiment, at least one, preferably each, substrate film comprises at least three layers, being a first outer layer, a second outer layer and at least one additional layer; the at least one additional layer being in between the first outer layer and the second outer layer. In an embodiment, at least one, preferably all, substrate film consists of three layers, being a first outer layer, a second outer layer and at least one additional layer; the at least one additional layer being in between the first outer layer and the second outer layer. In this embodiment there is at least one interface between either the first outer layer and the at least one additional layer or between the second outer layer and the at least one additional layer. Also two interfaces may be present between each of the three layers.

In an embodiment, at least one, preferably each, substrate film comprises at least 9 layers, being a first outer layer, a second outer layer and at least seven additional layers; the at least seven additional layers being in between the first outer layer and the second outer layer. In an embodiment, at least one, preferably all, substrate film consists of nine layers, being a first outer layer, a second outer layer and seven additional layers; the seven additional layer being in between the first outer layer and the second outer layer. Between the layers there are five interfaces.

In an embodiment, the first outer layer or second outer layer (preferably the second outer layer) of at least one, preferably each, substrate films is provided with a coating and/or printing. In an embodiment, the coating is an anti-reflection coating to enhance the visual effect of printed pattern. In an embodiment, the coating is a barrier coating, such as an oxygen and/or moisture and/or UV barrier coating. In an embodiment, the coating is an anti-fogging coating. In an embodiment, a first outer layer is subjected to a corona treatment prior to applying a coating. In an embodiment, the coating is a soft touch coating to improve the touching experience of the multilayer assembly. In an embodiment, the printing is reversely applied on the surface of a second outer layer. With reverse printing, the first layer of colour that is visible is the first layer of colour that is applied (since it is viewed through a transparent outer layer). It is different from the normal print e.g. on paper, where the first layer of colour that is visible is the layer of colour that is applied last. Therefore it is called 'reverse' printing. In an embodiment, the first outer layer of each multilayer substrate film is suitable for printing and coating. In another embodiment, the second layer of each multilayer substrate d film is suitable for printing and coating. In an embodiment of the multilayer laminate film assembly, the printing and/or coating is in the middle of the laminate. The printing and/or coating is not considered a layer as such.

In an embodiment, the first outer layer of one substrate film is selected from the same class of materials as the first outer layer of another substrate film, for example from the same material.

In an embodiment, each substrate film is asymmetrical.

In an embodiment, the substrate film has at least one interface between layers of different classes of materials. In an embodiment, the substrate film has at least two, preferably at least three, interfaces between layers of different classes of materials. In an embodiment, the multilayer film assembly has at least four interface between layers of different classes of materials. In an embodiment, the multilayer film assembly has at least six, preferably at least ten interfaces between layers of different classes of materials. This ensures improved properties (e.g. strength and barrier properties) compared to a film (assembly) having the same total thickness and the same material. In other words, a film assembly having a PA film of 30 micrometer laminated to a PP film of 30 micrometer has inferior properties compared to a film assembly having alternating PA and PP (PA/PP/PA/PP/PA/PP/) each having a thickness of 10 micrometer.

In an embodiment, substrate film has a thickness of at most 100 µm, preferably at most 85 or at most 80 µm, more preferably at most 65 or at most 60 µm, even more preferably at most 45 or at most 40 µm; most preferably at most 35 or at most 30 µm.

The thickness of the laminate film assembly depends on its application. For example when the film assembly is used to prepare food packaging for e.g. liquids such as soup such as 1 litre packages, a thickness in the range of between 135 and 200 micrometer may be requirement. In case it is used for light weight solid food packaging, such as e.g. snacks such as 250 gram packages, a thickness of between 60 and 90 micrometres may be sufficient. In an embodiment, the multilayer laminate assembly has a thickness of at most 200 µm, preferably at most 160 µm, more preferably at most 135 or at most 120 µm, even more preferably at most 100 or 80 µm; most preferably at most 60 µm. Specific examples are thickness of 67 or 167 micrometer.

In an embodiment, the first outer layer and/or second outer layer of at least one, preferably each, substrate film are each independently made from a thermoplastic polymer, preferably selected from the group consisting of the classes of materials being polypropylenes, polyethylenes, polyamides, polyesters, ethylene vinyl alcohols, lamination adhesives and one or more combinations thereof.

In an embodiment, one or more layers of the multilayer substrate film may each independently be a polymer material, preferably a thermoplastic polymer material. In an embodiment, the polymer material may comprise one or more additives, such as antioxidant agents, slip agents, anti-blocking agents, static resistant agents, fire resistant agents, colour pigments, conductivity agents such as carbon fillers, reinforcement agents such as calcium carbonate (nano-)particles. A person skilled in the art is aware of these common additives. The additives may be added as such or in the form of a master batch.

In an embodiment, the second outer layer of at least one, preferably each, substrate film is a functional layer made from a thermoplastic material. Said functional layer has the effect of providing good mechanical and barrier properties. Said functional layer may be made from a thermoplastic polymer such as poly(ethylene)terephthalates, polypropylenes, ethylene vinyl alcohols and polyamides.

In an embodiment, the second outer layer of at least one, preferably each, substrate film is made from a material selected from the group consisting of the classes of materials being polypropylenes, polyesters, polyamides, ethylene vinyl alcohols.

In an embodiment, the first outer layer of at least one, preferably each, substrate film is a sealing layer made from a thermo-sealable polymer, preferably selected from the group consisting of the classes of materials being polypropylenes, polyethylenes, polyamides, polyesters, ethylene vinyl alcohols, lamination adhesives.

In an embodiment, at least one, preferably each, substrate film is a co-extruded film. In an embodiment, at least one, preferably each, substrate film is a biaxially oriented film.

In an embodiment, at least one, preferably each, substrate film comprises between 50 and 85 wt. %, preferably between 55 and 75 wt. % of one or more polypropylenes and between 15 and 50 wt. %, preferably between 25 and 45 wt. % of one or more polyamides, based on the total weight of the substrate film.

In an embodiment, at least one, preferably each, substrate film comprises between 40 and 80 wt. %, preferably between 45 and 70 wt. % of one or more polyethylenes and between 20 and 60 wt. %, preferably between 30 and 55 wt. % of one or more polyamides, based on the total weight of the substrate film.

In an embodiment, the substrate films are laminated together to form the assembly by means of an adhesive. In an embodiment, the adhesive has a thickness of between 1 and 10 micrometre, such as between 2 and 10 micrometer. In an embodiment, the adhesive is selected from the class of laminate adhesive materials (as shown in the definition above). This adhesive is present in between two substrate films. This adhesive is not considered to be a layer.

In an embodiment, the lamination is carried out by means of dry bonding. This is a very suitable technique to use. In an embodiment, as adhesives for dry bonding are polyurethane dispersions, acrylic emulsion based adhesives, acrylic solvent based adhesives, water-based polyvinyl alcohol, or high solids silicone solvent.

In an embodiment, the lamination is carried out by means of hot melt adhesion bonding. In an embodiment, the lamination is carried out by means of UV/E-beam bonding. In an embodiment, the lamination is carried out by means of extrusion lamination; this is especially suitable when some performance properties need to be further enhanced. For example, when using PA12 (nylon 12) between two PA layers to further enhance the moisture barrier of PA structures. Suitable examples of lamination adhesives for these classes are disclosed above in the definition section.

In an embodiment, at least one, preferably each, substrate film is a co-extruded film. An effect of this is that it allows efficient material usage since co-extrusion can combine thin layers of different classes of materials.

In an embodiment, at least one, preferably each, substrate film is a co-extruded biaxially oriented film. By biaxially orienting (viz. stretching in two directions) the films the strength and barrier properties are further increased.

In an embodiment, at least one, preferably each, substrate film comprises between 50-85 wt. %, preferably 55-75 wt. % of one or more polypropylenes and between 15-50 wt. %, preferably 25-45 wt. % of one or more polyamides, based on the total weight of the substrate film.

In an embodiment, at least one, preferably each, substrate film consists of between 50-85 wt. %, preferably 55-75 wt. % of one or more polyolefins and between 15-50 wt. %, preferably 25-45 wt. % of one or more polyamides, based on the total weight of the substrate film and wherein the combined wt. % adds up to 100 wt. %

In a specific embodiment, the multilayer laminate film assembly comprises two substrate films, each substrate films comprising between 25 and 50 wt. % of polyamides (forming the second outer layer) and between 50 and 75 wt. % of polypropylenes (forming the first outer layer). The multilayer laminate film according to this specific embodiment will have a polyamide core and polypropylene outer sealing layers. Without wishing to be bound to any specific theory, the inventor believes that the polyamide core provides the strength of the laminate film assembly whereas the polypropylene outer layers provide for optimal flexibility and good heat sealing properties. Preferably, the assembly thickness is 67 micrometer or even 60 micrometer. This specific embodiment provide the advantages of a very thin film without any of the disadvantages such as annoying noise or brittle feeling that accompanies other prior art thin films.

Figure 7:
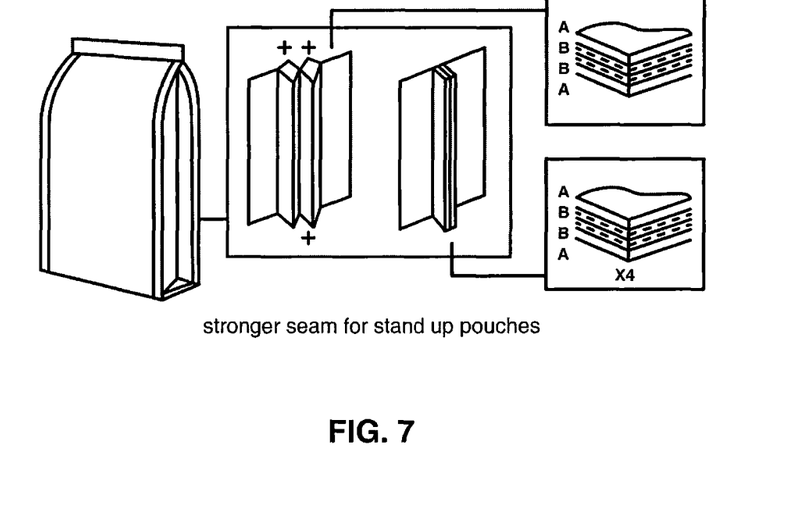
FIG. 7 shows a gusset type standing pouch according to the present invention.
Figure 8:
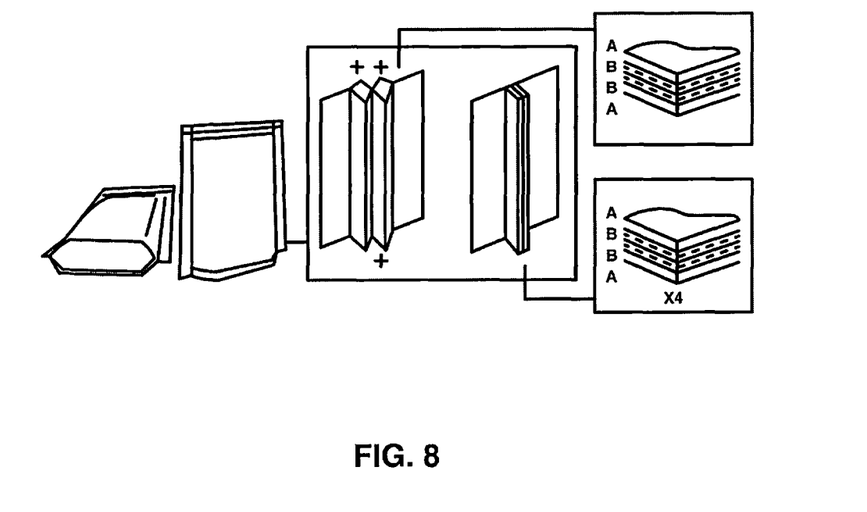
FIG. 8 shows a doy type standing pouch according to the present invention.

Corresponding embodiments are also applicable for the standing pouch according to the present invention. According to the present invention, the laminate film assembly may also be used for a ready-to-use pouch or a Form-Fill-Seal pouch or FFS pouch. In a first aspect the standing pouch is a doy type pouch as shown in FIG. 8. Said pouch comprises a front panel, a back panel, and a bottom panel, wherein all panels are from the multilayer laminate film according to the invention. The front panel and back panel are sealed together by means of sealing seams, wherein the sealing seams comprise at least three, preferably four, layers of the multilayer laminate film formed by at least a double folding of said multilayer laminate film and heat sealing thereof. When the sealing seam consists of three layers of the multilayer laminate film this can be obtained by a back and forth (double) folding of said multilaminate film. When the sealing seam consists of four layers of the multilayer laminate film this can be obtained by a back, forth, back forth (triple) folding of said multilaminate film as shown in FIG. 7 for a different type of pouch. The bottom panel of the doy type pouch is sealed to the front panel and the back panel using heat sealing. To realize this seal of the bottom panel to the front panel and to the back panel the bottom panel at least partly overlaps with the front panel and the back panel, wherein the overlapping parts are pressed together while applying a heat for realizing further sealing means. The seal of the bottom panel to the front panel and the back panel preferably consists of three layers. By using a sealing seam consisting of three layers of said multilaminate film a substantial perpendicular extension of the bottom panel respectively to the front panel and the back panel is created. A substantial perpendicular angle between the bottom panel and the front panel and between the bottom panel and the back panel is advantageous for realizing a relative stable positioning of the doy type pouch on a ground surface. Alternatively it is conceivable that the bottom panel is sealed respectively to the front panel and/or the back panel, wherein the seal of the bottom panel to the front panel and/or the back panel consists of two layers of said multilaminate film. This is advantageous for reducing the amount of material required for realizing a doy type pouch while maintaining a realizing a relative high bending stiffness of the pouch.

In a second aspect, the standing pouch is a gusset type pouch as shown in FIG. 7. Said pouch comprising a front panel, a back panel, two side panels, and a bottom panel, wherein all panels are from the multilayer laminate film according to the present invention. The front panel and back panel are sealed to the two side panels by means of sealing seams, wherein the sealing seams comprise at least three, preferably four, layers of the multilayer laminate film formed by at least a double folding of said multilayer laminate film and heat sealing thereof. See also the description above regarding the doy type packing relating to the number of laminate assembly films in the seams. The present invention provides for stronger seams by the aspect of the standing pouch—said sealing seams comprising for example four layers of the multilayer laminate film assembly as shown in the middle part of FIG. 7 with a so-called M-seam. FIG. 7 shows a side gusset stand up pouch where four vertical seams are made to enhance the stand-up capability of the pouch. For a conventional film laminate assembly which is sealable on one side, it is only possible to apply a so-called 'V' seal—leading to only two layers of laminate film assembly. Since the multilayer laminate film assembly in this invention comprises a sealable first outer layer on both sides (e.g. ABBA), it is feasible to apply a "M" or 'W' type seal which has four layers of assembly thus double the bending stiffness of the seam. The seam structure will have the following layering: ABBA//ABBA//ABBA//ABBA in case of embodiment of the multilayer laminate film assembly according to FIG. 1.

Figure 9:
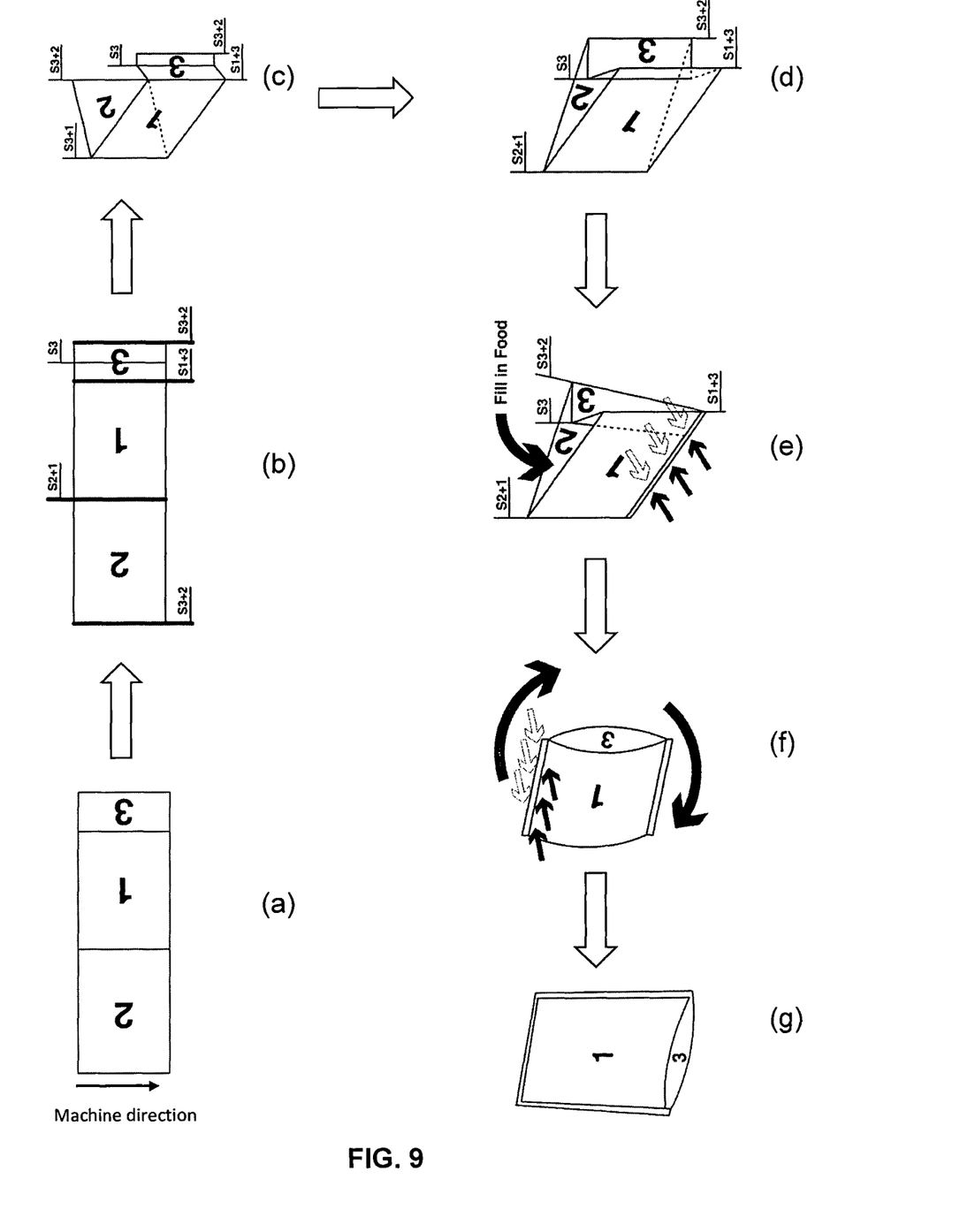
FIG. 9 shows a process for production of a FFS doy type of standing pouch according to the present invention.

FIG. 9 shows a method of manufacturing FFS type packaging. FIG. 9(a) shows a laminate film assembly (one-film-panel) according to the present invention being divided into three sections, section 1, 2, and 3. FIG. 9(b) shows the same laminate film assembly with the sealing seams that will be applied in the machine direction: S3+2 being a sealing seam between section 3 and 2, S2+1 being a sealing seam between section 2 and 1; S1+3 being a sealing seam between section 1 and 3; S3 being a sealing seam in section 3. FIG. 9(c) shows the same laminate film assembly with three sections in partially folded (sealed) form. FIG. 9(d) shows the laminate film assembly after sealing of the seams in machine direction. FIG. 9(e) shows the sealing of a seam between section 1, 2 and 3 in transverse direction and afterwards the filing of the food. FIG. 9(f) shows the sealing of a seam between section 1, 2, and 3 in transverse direction to close the filled FFS pouch. FIG. 9(g) shows the final FFS pouch.

When one side of the laminate film assembly according to the present invention is coated the sealing strength reduces compared to the sealing strength of an uncoated first outer layer. However, the sealing strength is still sufficient to provide a strong bending stiffness in the sealing seam for M-sealing. However, the sealing strength of a coated first outer layer may not be less than optimal for a hermetic sealing. However since the M-sealing is only used at the sides of the pouch from a single length of film assembly by folding, there is no hermetic seal needed. At the top and the bottom of the pouch where there is an opening that needs to be sealed using a hermetic seal, such a hermetic seal can easily be the sealing of at least one outer layer of the laminate film assembly, the one that is not coated. An advantage of the structure of the pouch according to the present invention is that it allows for stronger vertical and bottom seams, which in turns allows pouches to be made of significantly thinner films without compromise on the stand-up effect. The 'W' seal is also applicable for the simple doy-pack type or more complex gusset-pack type of stand-up pouch.

The sealing seams of the standing pouch according to the present invention in both the first and second aspect are beneficial for realizing a relative high bending stiffness of the pouch.

The foregoing description provides embodiments of the invention by way of example only. The scope of the present invention is defined by the appended claims. One or more of the objects of the invention are achieved by the appended claims. The present invention is described hereinafter with reference to the accompanying drawings in which embodiments of the present invention are shown and in which like reference numbers indicate the same or similar elements.

Figure 1:
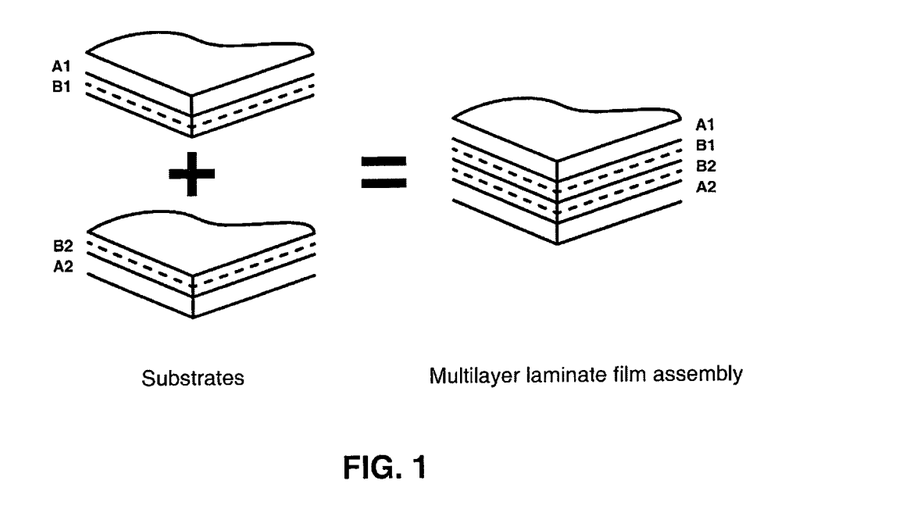
FIG. 1 shows an embodiment of a multilayer laminate film assembly according to the present invention consisting of two double layer substrate films.

FIG. 1 shows a first embodiment of the present invention. It shows on the left hand side two multilayer substrate films. A first multilayer substrate film having a first outer layer A1 and a second outer layer B1 and a second multilayer substrate film having a first outer layer A2 and a second outer layer B2. These two substrate films are laminated symmetrically to provide a multilayer laminate film assembly comprising layers A1B1B2A2 wherein the first outer layers A1, A2 of the substrate films form the outer layers of the assembly. The second outer layers B1 and B2 are laminated together and form the core part of the assembly. In this embodiment, the first and second outer layers of the substrate films, A1B1 and A2B2 respectively, are formed by co-extrusion. In the case that A1=A2 (meaning A1 and A2 are the same class of material) and B1=B2 (meaning B1 and B2 are the same class of material), the laminate will have the form of AB//BA. The effect of the symmetrical assembly makes the film flat without curling. In addition, it is heat sealable from both sides thus providing more freedom in pouch structure design. The effect of asymmetrical assembly (e.g. BA//BA) has the effect of excellent heat resistance during bag sealing; this embodiment is very suitable for high speed bag making production of SUP since during high speed bag making production the temperatures are high.

Examples of material classes that can be used in the first outer layer of the substrate film (for this and any other embodiment of the present invention) are materials suitable for heat sealing such as the class polypropylene materials, polyethylene materials, polyamides, polyesters, ethylene vinyl alcohols, lamination adhesives.

Most preferred materials for the outer layers of the laminate film assembly (for this and any other embodiment of the present invention) and hence of the first outer layer of the substrate films are from the class of polyethylene materials such as (metallocene catalysed) LLDPE; ethylene vinyl acetate and ionized ethylene and meth acrylic acid copolymer; and from the class of polypropylene materials such as polypropylene random copolymers. It should be noted that these materials will be on the outer side of the multilayer laminate film assembly and will be transformed into e.g. a pouch by heat sealing the edges. It is recommended to use a sealing material that can bring high seal strength, high hot tack strength, with wider temperature zone of seal strength plateau and lower seal initiation temperature.

Examples of material classes that can be used in the second outer layer (for this and any other embodiment of the present invention) are materials that have both good mechanical strength and barrier properties such as the class of polypropylene materials, the class of polyester materials (e.g. polyethylene terephthalates), the class of ethylene vinyl alcohol materials, and the class of polyamide materials. It should be noted that these materials could be on the inner side (also called core) of the multilayer laminate film assembly and will be laminated together to form the assembly. These layers may be used to provide functional features, such as printing, coating, barrier functions, strength etc. Since this second outer layer of the substrate film is also the key functional layer for coating, printing and lamination, it is preferred to use high frequency discharge treat the surface (corona treatment). It should be mentioned that corona treated films have the disadvantage that they do not provide good heat sealing strength. This is solved by the present invention by preferably having the corona treated films in the core of the laminate avoiding any need for heat sealing of these corona treated films. The heat sealing according to the present invention is carried out using the outer layers, which are preferably not corona treated.

Figure 2:
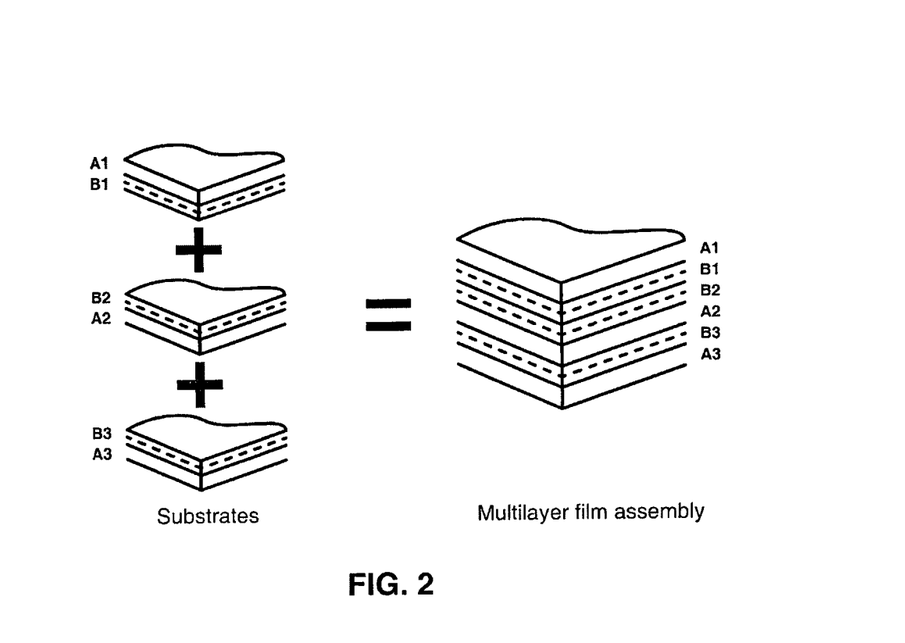
FIG. 2 shows an embodiment of a multilayer laminate film assembly according to the present invention consisting of three double layer substrate films.

FIG. 2 shows an embodiment of the laminate film assembly consisting of three multilayer substrate film. The first substrate film comprises a first outer layer A1 and a second outer layer B1. The second substrate film comprises a first outer layer A2 and a second outer layer B2. The third substrate film comprises a first outer layer A3 and a second outer layer B3. The laminate film assembly is obtained by laminating the first substrate film to the second substrate film wherein the second outer layer B1 of the first substrate film is connected to the second outer layer of the second substrate film B2 and by laminating the second substrate film to the third substrate film, wherein the first outer layer of the second substrate film A2 is connected to the second outer layer of the third substrate film B3. The outer layers of the laminate film assembly are formed by the first outer layer of the first substrate film A1 and the first outer layer of the third substrate film A3. The substrate films are hence laminated together to form a laminate A1B1//B2A2//B3A3 or in another embodiment A1B1//A2B2//B3A3 (not shown) or A1B1//B2A2//A3B3. In the case that the first outer layers of the three substrate films are of the same class of material or even of the same material (viz. A1=A2=A3) and wherein the second outer layers of the three substrate films are of the same class of materials or even of the same material (viz. B1=B2=B3), the laminate will have the form of AB//BA//BA, or AB//AB//BA or AB//BA//AB. This modular design allows the creation of complicated layer structure by using standardized substrate films to increase flexibility in the design using a limited number of standardized substrate films.

Figure 3:
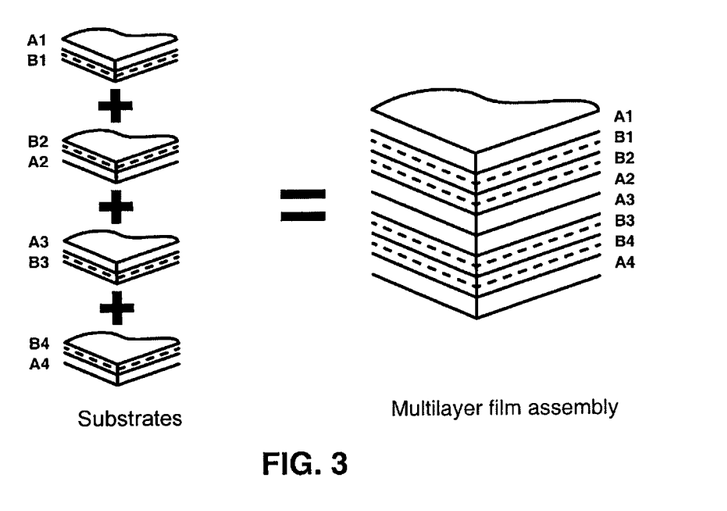
FIG. 3 shows an embodiment of a multilayer laminate film assembly according to the present invention consisting of four double layer substrate films.

FIG. 3 shows another embodiment of the multilayer laminate film assembly according to the present invention consisting of four substrate films. The first substrate film comprises a first outer layer A1 and a second outer layer B1. The second substrate film comprises a first outer layer A2 and a second outer layer B2. The third substrate film comprises a first outer layer A3 and a second outer layer B3. The fourth substrate film comprises a first outer layer A4 and a second outer layer B4. The laminate film assembly is obtained by laminating the first substrate film to the second substrate film to the third substrate film to the fourth substrate film. In an embodiment, wherein the second outer layer B1 of the first substrate film is connected to the second outer layer of the second substrate film B2 and the second outer layer B3 of the third substrate film is connected to the second outer layer of the fourth substrate film B4 and the first outer layers of the second and third substrate films (A2, A3) are connected together. The outer layers of the laminate film assembly are formed by the first outer layer of the first substrate film A1 and the first outer layer of the fourth substrate film A4. The substrate films are laminated together to symmetrically form a laminate film assembly A1B1//B2A2//A3B3//B4A4. In the case that the first outer layers of all substrate films are of the same class of materials or of the same material (viz. A1=A2=A3=A4), and the second outer layers of all substrate films are of the same class of materials or of the same material (viz. B1=B2=B4=B4), the laminate will have the form of A/B/A//A/B/A. In a first lamination step the second outer layers B1 and B2 and B3 and B4, respectively are bonded together by means of an adhesive. In a second lamination step the layers A2 and A3 are bonded together by means of either an adhesive or by melt-extrusion of additional polyethylene. This structure potentially allows up to six barrier coating layers (B1, B2, A2, A3, B3, B4), which can be designed for applications requiring ultra-high oxygen and moisture barrier. In an embodiment, the laminate assembly according to the present invention may be used as substitution of laminate assemblies using aluminium foil for packaging. The present invention allows for a modular approach to manage the complicated pouch film structure. As shown below in the detailed description two or more substrate films may be laminated together. In case for example a stronger film or a film having higher barrier properties is required, this can be easily obtained by just adding an additional substrate film to the laminate film assembly. With one single substrate film a variety of laminate film assemblies may be formed without changing the overall composition of the material classes for the laminate film assembly allowing easy recycling. The present invention allows for the use of a standardized substrate film, leading to a standardized input for recycling. By using a standardized substrate film this on the one had still allows flexibility for different types of assembly and on the other hand it allows a standardized input for recycling. The material that is recycled may be used for many different products, such as for example high barrier—high strength containers for carrying for example food, feed, liquid, oil, gasoline etc. A laminate assembly structure based on multilayer substrate films that are standardized allows the building of very complicated structure. No matter how complicated the film structure could be, it may always be built of the same type of substrate films. Once the performance of the single substrate film has been determined, the performance of the whole laminate film assembly becomes predictable. And since the composition of the single substrate is fixed, it is feasible to design a specific end application to recycle the assembly waste. For example, the waste of a high barrier substrate composed of PE, PA and EvOH can be the base material for a high barrier container with excellent mechanical strength.

Figure 4:
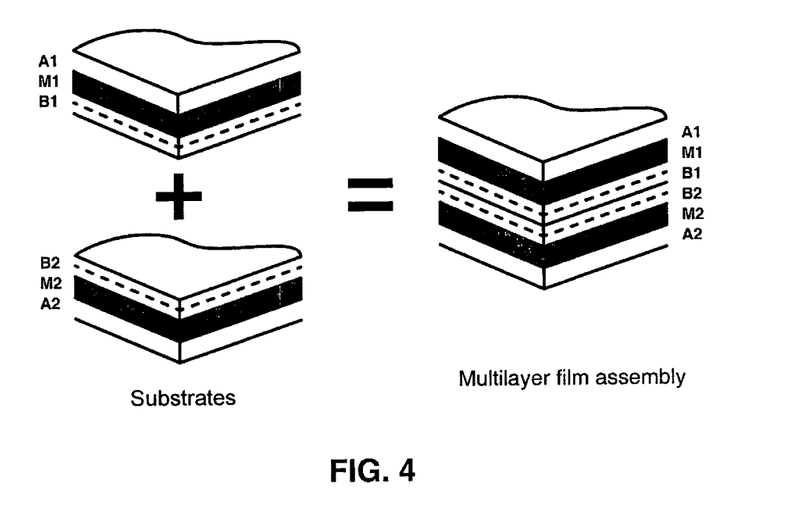
FIG. 4 shows an embodiment of a multilayer laminate film assembly according to the present invention consisting of two triple layer substrate films.

FIG. 4 discloses an embodiment of the laminate film assembly consisting of two substrate layers, each consisting of three layers. The first substrate layer comprises a first outer layer A1, an additional layer in the middle (M1) and a second outer layer B1. The second substrate layer comprises a first outer layer A2, an additional layer in the middle (M2) and a second outer layer B2. The laminate film assembly is obtained by laminating the first substrate film to the second substrate film wherein the second outer layer B1 of the first substrate film is connected to the second outer layer of the second substrate film B2. The outer layers of the laminate film assembly are formed by the first outer layer of the first substrate film A1 and the first outer layer of the second substrate film A2. The laminate film assembly will have the form of A1M1B1//B2M2A2. In the case that the first outer layers, the second outer layers and the additional layers of the two substrate films, respectively are of the same class of material or even of the same material (viz. A1=A2 and B1=B2 and M1=M2), the laminate film assembly will have the form of AMB//BMA.

According to an embodiment of the present invention, the additional layer in the middle (M) may be a functional layer, for example for enhancing the substrate film performance such as a barrier against oxygen and/or aroma barrier. This functional film, in an embodiment, may be made from the class of ethylene vinyl alcohol materials (EVOH). It may for example have a thickness of between 1 and 10, or between 2-5 micrometre. In case a 2-5 micrometre thick EVOH layer is used as the functional additional layer, oxygen permeability of a totally 60 micrometre thick multilayer laminate film assembly may be lower than 5 $cm^3/m^2 \cdot day \cdot atm$, measured according to ASTM D3985-05(2010) (24 h, 1 atm, 23 degrees C., 65% RH). In an embodiment, a multilayer laminate film assembly has an oxygen permeability of below 5 $cm^3/m^2$, measured according to ASTM D3985-05(2010) (24 h, 1 atm, 23 degrees C., 65% RH Such a value is considered sufficient for the barrier requirement of most food packaging. EVOH is suitable for most food packaging and allows modular approach. For certain types of food, e.g. coffee, metalized layers may be added as additional layers.

Figure 5:
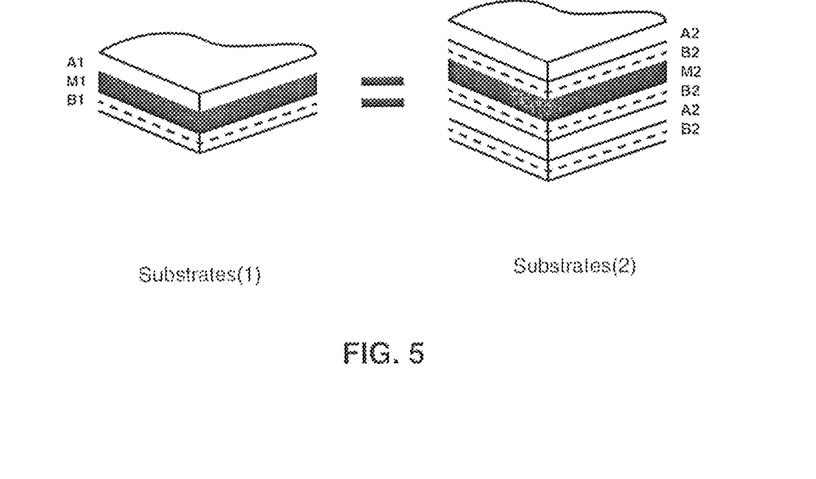
FIG. 5 shows another embodiment of a multilayer laminate film assembly according to the present invention consisting of two triple layer substrate films.

FIG. 5 discloses an embodiment of the laminate film assembly (not shown) consisting of two substrate layers. The first substrate layer comprises a first outer layer A1, an additional layer in the middle (M1) and a second outer layer B1. The second substrate layer comprises a first outer layer A2, a first additional layers B2 (being of the same class of material as the second outer layer), a second additional layer M2, a third additional layers B2 (being of the same class of material as the second outer layer), a fourth additional layers A2 (being of the same class of material as the first outer layer) and a second outer layer B2. The laminate film assembly (not shown) is obtained by laminating the first substrate film to the second substrate film wherein the second outer layer B1 of the first substrate film is connected to the second outer layer of the second substrate film B2. The outer layers of the laminate film assembly are formed by the first outer layer of the first substrate film A1 and the first outer layer of the second substrate film A2. The laminate film assembly will have the form of A1M1B1//B2A2B2M2B2A2. In the case that the first outer layers are of the same class of material (viz. A1=A2) and the same amount of material in the substrate film (viz. A1 wt. %=total A2 wt. %) and the second outer layers and additional layers are of the same class of material (viz. B1=B2) and the same amount of material in the substrate film (viz. B1 wt. %=total B2 wt. %), and the additional layers are of the same class of material (viz. M1=M2), and the same amount of material in the substrate film (viz. M1 wt. %=M2 wt. %), B1t can be considered that the first substrate film and the second substrate film are of the same type of substrate even though the number of layers varies. The second substrate film according to this embodiment is an example of further optimizing the performance of the first substrate film. In this embodiment, a preferred class of material for the first outer layers (A1,A2) is polyethylene or polypropylene; a preferred class of materials for the second outer layers (B1,B2) is polyamides (PA); a preferred class of materials for the middle layer (M1,M2) is ethylene vinyl alcohol (EvOH). When EvOH is sandwich-positioned in between two PA layers—as is the case with the second substrate film having an A2B2M2B2A2B2 structure, it will have more homogenous layer thickness distribution during co-extrusion thus have optimized barrier performance in comparison with the first substrate film having a A1M1B1 structure even though the composition in weight percentage is the same. Thus by distributing several (e.g. PA based) layers across the substrate film structure, the second substrate film will reach higher bending stiffness than the first substrate film. In an embodiment, an barrier film, e.g. a EVOH film, is preferably in between two polyamide based films.

Figure 6:
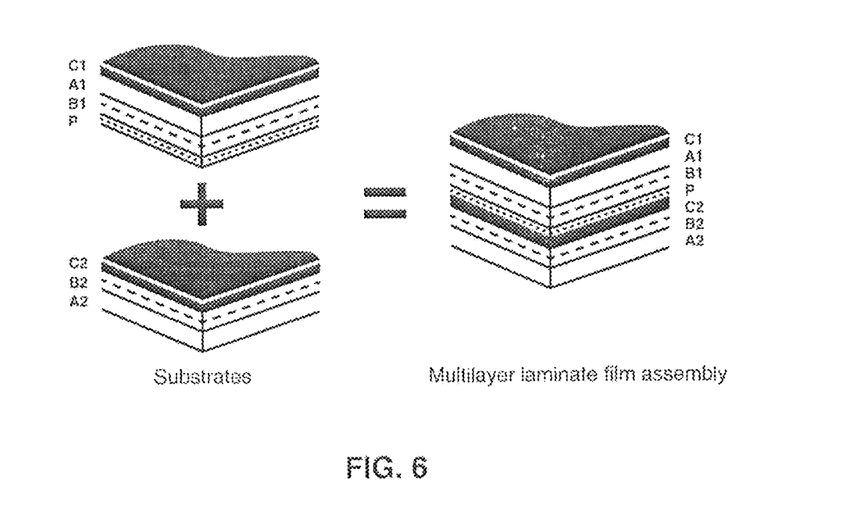
FIG. 6 shows an embodiment of a multilayer laminate film assembly according to the present invention consisting of a coated double layer substrate film and a coated and printed double layer substrate film.

In an embodiment, shown in FIG. 6, the multilayer laminate film assembly consists of a first substrate film consisting of a coated C1 first outer layer A1, and a printed P second outer layer B1 and of a second substrate film comprising a first outer layer A1, and a coated C2 second outer layer B2. These two substrate films are laminated to provide a multilayer laminate film assembly comprising layers C1A1B1P//C2B2A2 wherein the coated C1 first outer layer A1, and first outer layer A2 of the substrate films form the outer layers of the assembly. The printed or coated second outer layers P-B1 and C2-B2 are laminated together and form the core part of the assembly. The layer C1 is transparent and provides a view to the patterns reversely printed on B1. The first layer of colour that is visible, is the layer that is applied first to B1. The application of printing and/or coating on the substrate films increases the functional flexibility of the laminate film assembly. In the case that the first and second outer layers are of the same class of material (viz. respectively A1=A2 and B1=B2) the laminate will have the form of C1/A/B/P//C2/B/A.

In an embodiment of the present invention, up to four outer layers (the first and second outer layers when using two substrate films) may be provided with a coating and or a printing while one lamination step is needed. This allows maximum flexibility with a simple process.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope thereof.

The foregoing description provides embodiments of the invention by way of example only. The scope of the present invention is defined by the appended claims. One or more of the objects of the invention are achieved by the appended claims.

EXAMPLES

The present invention is further elucidated based on the Examples below which are illustrative only and not considered limiting to the present invention. In the below examples, the weight percentages (wt. %) cited are the weight percentages based on the total weight of the substrate film and not based on the weight of the individual layer.

Substrate Film 1a (SF 1a)

Substrate film 1a is a co-extruded film prepared from a cast extrusion film line. The first outer layer (A1a) is a sealing layer made from the class of materials of polypropylene, comprising a mixture of polypropylene homo-polymer (H-PP) forming 25 wt. % of the substrate film, a random polypropylene copolymer (RACO-PP) forming 4 wt. % of the substrate film (material class of PP) and a PP based master batch containing antioxidant, slip and anti-block agent forming 1 wt. % of the substrate film. The second outer layer (B1a) is a functional layer made from the class of materials of polyamides comprising PA-6 (obtained from DSM Akulon F132E2) forming 10 wt. % of the substrate film.

The substrate film further comprises seven additional layers (one PP layer, one EVOH layer, two PA6 layer and three PP based tie resin layers) in between the first and second outer layers. Total structure has the following composition: PP/PA/EVOH/PA/PP comprising 20 wt. % of PA having the same composition as in second outer layer B1, 30 wt. % of PP, being 20 wt. % an anhydride grafted polypropylene (MA-PP) tie resin; and 10 wt. % of EVOH. Substrate film 1a has a total thickness of 35 μm comprising three material classes (polypropylenes, polyamides and EVOH) comprising PP in an amount of 60 wt. %, PA in an amount of 30 wt. % and EvOH in an amount of 10 wt. %, as described in table 1 below.

TABLE 1

| | $1^{st}$ outer layer | First, third and seventh additional layer | Second and fourth additional layer | Fifth additional layer | Sixth additional layer | $2^{nd}$ outer layer |
|---|---|---|---|---|---|---|
| Layer | A1a | M1, M3, M7 | M2, M4 | M5 | M6 | B1a |
| type of material | PP | PP-g-MA | PA6 | EVOH | PP | PA6 |
| Class of material | PP | PP | PA | EVOH | PP | PA |
| Wt. % | 30 | 20 | 20 | 10 | 10 | 10 |

Substrate Film 1b (SF 1b)

Substrate film 1b is a co-extruded blown film prepared from a cast extrusion film line. Compared with substrate film 1a, the only difference in the film structure is in the first outer layer (A1a). It is from the class of materials of polypropylene, comprising polypropylene homo-polymer (H-PP) forming 14 wt. % of the substrate film, a random polypropylene copolymer (RACO-PP) forming 15 wt. % of the substrate film and a PP based master batch containing antioxidant, slip and anti-block agent forming 1 wt. % of the substrate film. The higher proportion of the random polypropylene copolymer (RACO-PP) of this substrate film, compared to the first substrate film will result in a 10-25 degree Celsius lower initial sealing temperature compared with substrate film 1a. It should be noted that in line with the definitions in the present application, substrate film 1a and substrate film 1b can be treated as the same type of substrates.

The material properties SF 1a and SF 1b to be used in a multilayer laminate film assembly according to the present invention are disclosed in table 2 below showing the thickness (measured according to DIN 53370-2006 and having as a unit micrometre), the oxygen transmission rate (measured ASTM D3985-05(2010) (24 h, 1 atm, 23 degrees C., 65% RH) the water vapour transmission rate (measured according to ASTM E-96-05 and having as a unit gram/m2·day·atm @ 38° C. with 90% relative humidity), tensile strength (MD) (measured according to ASTM D-882-12 and having as a unit MPa), elongation at break (measured according to ASTM D-882-12 and having as a unit percentage). Table 4 shows that the substrate film 1a and 1b has comparable mechanical properties. According to these properties, examples of multilayer assemblies were prepared, which will be measured according to the same measuring standards.

TABLE 2

| Film property | SF 1a | SF 1b |
| --- | --- | --- |
| Thickness | 35 | 30 |
| Oxygen Transmission Rate | 3.0 | 3.5 |
| Water Vapour Transmission Rate | 6.8 | 7.9 |
| Tensile Strength (MD) | 58 | 57 |
| Elongation at break (MD) | 420 | 410 |

Example 1—Multi-Layer Laminate Assembly 1 (MLA 1)

A multilayer laminate assembly is formed of two substrate films, one SF 1a and one SF 1b. SF 1a is provided with a printing P on the second outer layer (PA) then is symmetrically laminated with SF 1b. The structure of the laminate film assembly is as shown in table 3. The lamination adhesive (AD) for film lamination is a polyurethane based commercial grade; this layer is of the class of material of lamination adhesives. The total thickness is 67 micrometre. MLA 1 has 19 different layers and 12 interfaces between layers of different classes of material. Average layer thickness of MLA 1 is 3.7 micrometres.

Compare Example 1—Coextruded Multi-Layer Film 1 (COF 1)

Compare example 1 is a co-extruded film prepared from a cast extrusion film line. The film structure and materials are the same as SF 1a. The film thickness is 70 micrometre. COF 1 has 9 different layers and 5 interfaces between different material layers (between layers 2 and 3, 3 and 4, 4 and 5, 5 and 6 and 8 and 9). Average layer thickness of MLA 1 is 7.8 micrometres.

Compared with MLA 1, COF1 does not contain two micrometre of the polyurethane based adhesive, but has five micrometre thickness of extra film material. In view of material used, COF1 is comparable to or slightly better than MLA 1. Since the material impact is excluded, the performance difference between MLA 1 and COF 1 can be used to directly assess the effectiveness of this invention.

The film barrier and mechanical properties are described in table 4. MLA 1 has an obvious improvement of oxygen transmission rate (reduced by 27%) and moisture transmission rate (reduced by 15%). Compared with COF 1, MLA 1 has two special features: 1) MLA 1 has double amount of material layers and interfaces between different material layers; 2) The average layer thickness of MLA 1 is half of that of COF 1. This leads to a high number of interfaces between different material layers and provides improved barrier properties in addition to the barrier properties provided by barrier materials themselves. And the thinner material layer improves the molecular orientation in X, Y direction, which also has positive impact to barrier properties. In addition, MLA 1 has the improvement in mechanical properties. It is in line with the theory that better molecular orientation improves mechanical properties. More positively, by a tactile examination of the film, a professional can tell MLA 1 has similar bending stiffness but feels softer or less rigid than COF 1. It proves that by putting thinner layers of higher bending stiffness material (PA when the layer is dry) at the place closer to the outer layers of the film can reduce the rigidity for consumers without harming the bending stiffness of film.

TABLE 4

| Film property | MLA1 | COF 1 | Diff. |
| --- | --- | --- | --- |
| Thickness | 67 | 70 | −4% |
| Oxygen Transmission Rate | 1.1 | 1.5 | −27% |
| Water Vapour Transmission Rate | 3.5 | 4.1 | −15% |
| Tensile Strength (MD) | 52 | 46 | 9% |
| Elongation at break (MD) | 450 | 430 | 5% |

TABLE 3

| Substrate | SF 1 | | | | | | | | | | SF 2 | | | | | | | | |
| --- | --- | --- | --- | --- | --- | --- | --- | --- | --- | --- | --- | --- | --- | --- | --- | --- | --- | --- | --- |
| No. Layer | 1 | 2 | 3 | 4 | 5 | 6 | 7 | 8 | 9 | AD | 10 | 11 | 12 | 13 | 14 | 15 | 16 | 17 | 18 |
| Material | PP | PP-g-MA | PA | EvOH | PA | PP-g-MA | PP | PP-g-MA | PA | | PA | PP-g-MA | PP | PP-g-MA | PA | EvOH | PA | PP-g-MA | PP |

Example 2—Multi-Layer Laminate Assembly 2 (MLA 2)

A multilayer laminate assembly is formed by further laminating two MLA 1 into a four-ply laminate (MLA 2). The structure of the laminate film assembly MLA 2 is as shown in table 5. The adhesive (AD) for film lamination is a polyurethane based commercial grade and is a layer of the class of material of lamination adhesives. The total thickness is 136 micrometre. MLA 2 has 39 different layers and 26 interfaces between different material layers. Average layer thickness of MLA 2 is 3.7 micrometres.

TABLE 5

| Substrate | SF 1 | | SF 2 | | | SF 1 | | | SF 2 | |
| --- | --- | --- | --- | --- | --- | --- | --- | --- | --- | --- |
| No. Layer | 1 | 2-8 | 9 | AD | 10 | 11-17 | 18 | AD | 19 | 10-26 | 27 | AD | 28 | 29-35 | 36 |
| Material | PP | middle lays | PA | | PA | middle lays | PP | | PP | middle lays | PA | | PA | middle lays | PP |

Compare Example 2—Coextruded Multi-Layer Film 1 (COF 2)

Compare example 2 is a co-extruded film prepared from a cast extrusion film line. The film structure and materials are the same as SF 1a. The film thickness is 150 micrometre. COF 2 has 9 different layers and 8 interfaces between different material layers. Average layer thickness of MLA 1 is 16.7 micrometres.

Compared with MLA 2, COF2 does not contain six micrometre of the polyurethane based adhesive, but has 20 micrometre thickness of extra film material. In view of material used, COF1 is better than MLA 2. The performance advantage of MLA 2 compared with COF 1 can therefore be directly attributed to the effectiveness of this invention.

The film barrier and mechanical properties are described in table 6. The advantages of MLA 2 over COF 2 are in the same direction as those of MLA 1 over COF 1, but even more significant. Although MLA 2 is 9% thinner than COF 2, its oxygen transmission rate is 44% lower and moisture transmission rate is reduced by 41%. Mechanically, MLA 2 is clearly stronger than COF 2. By touching the film, a non-professional person can tell MLA 2 has higher bending stiffness but feels softer than COF 2. The more pronounced improvement can be interpreted as MLA 2 has significantly more number of layers (36 vs. 9), more interfaces between different material layers (35 vs 8), much thinner layers (3.7 vs 16.7 micron meters) and more optimized PA layer position, as a result of the present invention.

TABLE 6

| Film property | MLA 2 | COF 2 | Diff. |
|---|---|---|---|
| Thickness | 136 | 150 | −9% |
| Oxygen Transmission Rate | 0.5 | 0.9 | −44% |
| Water Vapour Transmission Rate | 1.7 | 2.9 | −41% |
| Tensile Strength (MD) | 49 | 41 | 20% |
| Elongation at break (MD) | 440 | 410 | 7% |

Example 3—Doy Style Stand-Up Pouch (VFFS-MLA 1)

MLA 1 (Example 1) is further processed on GEA Smart-Packer cx400, the Vertical Form Film Seal (VFFS) machine, to produce the doy style stand-up pouch. Packing machine settings may be varied according to need in view of the temperature, humidity of packing environment and the food packed. A person skilled in the art of food packaging will be able to select the correct settings.

Compare Example 3—Doy Style Stand-Up Pouch (VFFS-OPP/PE)

The film to make comparative example 3 is a 20 micron biaxially oriented polypropylene (BOPP) film laminated with a 60 micron PE blown film (OPP/PE). Compared with an unstretched PP or PE film, BOPP has significantly higher tensile strength and modulus as well as better oxygen and moisture barrier. Consequently, the OPP/PE laminated structure can be 30-40% thinner than a mono PE or PP film for stand-up pouch application.

COF 1 film is not used for comparison with example 3, because it is already inferior to MLA 1 in all aspects. And as an coextruded film, it is not reverse printable therefore much less used to make printed vertical form fill seal (VFFS) stand-up pouches.

The film property comparison between MLA 1 and OPP/PE is listed in table 7. Since BOPP is the major property contributor to OPP/PE film, the BOPP property is used here as the comparison indicator. Clearly OPP/PE will have significantly higher bending stiffness than MLA 1, which is predicted to have advantages in high speed packing and to bring more straight stand-up effect. On the other hand, MLA 1 is 16% thinner with much better oxygen and moisture barrier properties.

TABLE 7

| Film property | MLA 1 | OPP/PE |
|---|---|---|
| Thickness | 67 | 80 |
| Oxygen Transmission Rate | 1.1 | 1800 |
| Water Vapour Transmission Rate | 3.5 | 5.5 |
| Tensile Strength (MD) | 50 | 120 |
| Elongation at break (MD) | 450 | 160 |

The result of VFFS production is listed in table 8. Surprisingly, VFFS-MLA 1 is not inferior to VFFS-OPP/PE in high speed packing, sealing quality and stand-up effect. When grabbing the packaging, a non-professional person (e.g. consumer) can tell the difference, because VFFS-MLA feels stiff but less brittle with less noise. Such touch feeling is associated to the impression of quality and elegancy.

TABLE 8

| Film/Pouch performance | VFFS-MLA 1 | VFFS-OPP/PE |
|---|---|---|
| High speed packing | Yes | Yes |
| Sealing quality | Good | Good |
| Stand-up appearance | Good | Good |
| See through | Very good | Acceptable |
| Noise when touching | Moderate | Loud |
| Touch feeling | Stiff, resilient | Rigid, brittle |

Example 4—Heavy-Load Doy Style Pouch with Four-Layer Seam Folding

MLA 1 is hand-made into a Doy style pouch suitable for heavy load contents. The pouch has a size of 20 cm (Length)×15 cm (Width)×6 cm (bottom gusset width). A four layer sealing seam according to this invention is applied at the side to seal front and back panels, as well as applied at the bottom to seal the bottom gusset with the front and back panels. As the result, the thickness of the seams is 268 micron with the thickness of the front, back panels and bottom gusset is only 67 micron. A 500 gram of castor bean seeds is then packed in the hand-made pouch to judge the stand-up effect. In the market, a typical film thickness for such type of packaging is between 120 and 150 microns.

The seams at the side and the bottom are strong enough to support the heavy content in the packaging to 'stand up'. There is no bending at the side and bottom seam. This result confirms that a four-layer seam can reduce the thickness of the multilayer assemble by up to 50% for a heavy load stand-up pouch.

The invention is further elucidated by the following claims.

What is claimed is:
1. A multilayer laminate film assembly comprising at least two multilayer substrate films;
  each multilayer substrate film comprising at least a first outer layer and a second outer layer;

wherein the at least two multilayer substrate films each comprise at least two layers of different polymer materials, the polymer material of the first outer layer differing from the polymer material of the second outer layer in each of said at least two multilayer substrate films;

wherein the second outer layer of each of the at least two of multilayer substrate films are directly laminated to each other such that no gaps exist between the second outer layers within the multilayer laminate film assembly, wherein the first outer layer of at least one of said at least two multilayer substrate films is a sealing layer made from a thermo-sealable polymer comprising at least polypropylene or at least polyethylene; and wherein the second outer layer of at least one of at least two multilayer substrate films is comprises at least polyamide or at least polypropylene;

wherein, when polypropylene is present in the substrate film the substrate film comprises between 50 to 85 wt % polypropylene;

wherein, when polyethylene is present in the substrate film the substrate film comprises between 40 to 80 wt % polyethylene; and wherein, when polyamide is present in the substrate film the substrate film comprises 20 to 60 wt % polyamide.

2. The multilayer laminate film assembly according to claim 1, wherein the first outer layer of each of the multilayer substrate films form outer layers of the multilayer laminate film assembly.

3. The multilayer laminate film assembly according to claim 1, comprising three, four, six or eight of the multilayer substrate films.

4. The multilayer laminate film assembly according to claim 1, wherein at least one of said at least two multilayer substrate films comprises at least three layers, said at least three layers comprising the first outer layer, the second outer layer, and at least one additional layer; said at least one additional layer being in between the first outer layer and the second outer layer.

5. The multilayer laminate film assembly according to claim 1, wherein the first outer layer or the second outer layer of at least one multilayer substrate film is provided with a coating and/or a printing.

6. The multilayer laminate film assembly according to claim 1, wherein each multilayer substrate film is asymmetrical.

7. The multilayer laminate film assembly according to claim 1, wherein at least one multilayer substrate film has a thickness of at most 100 μm.

8. The multilayer laminate film assembly according to claim 1, wherein said multilayer laminate film assembly has a thickness of at most 200 μm.

9. The multilayer laminate film assembly according to claim 1, wherein the second outer layer of at least one of said multilayer substrate films has a surface energy higher than 40 dyne/cm.

10. The multilayer laminate film assembly according to claim 1, wherein at least one of said multilayer substrate films is a co-extruded film.

11. The multilayer laminate film assembly according to claim 1, wherein the first outer layer of each of said at least two multilayer substrate films further comprises at least one of polyamides, polyesters, ethylene vinyl alcohols, lamination adhesives, or any combination thereof.

12. A standing pouch comprising a front panel, a back panel, and a bottom panel, wherein each panel independently comprises a multilayer laminate film assembly according to claim 1, wherein the front panel and back panel are sealed together by means of sealing seams, wherein the sealing seams are formed by at least double folding and heat sealing each multilayer laminate film assembly, such that each sealing seam comprises at least three layers of multilayer laminate film assembly material.

13. The standing pouch according to claim 12, wherein said standing pouch comprises further sealing seams for sealing said front panel and said back panel to said bottom panel, wherein said further sealing seams are formed by at least double folding and heat sealing each multilayer film assembly, such that each sealing seam comprises at least three layers of the multilayer laminate film assembly material.

14. A standing pouch comprising a front panel, a back panel, two side panels, and a bottom panel, wherein each panel independently comprises a multilayer laminate film assembly according to claim 1, wherein the front panel and back panel are sealed to the two side panels by means of sealing seams, wherein the sealing seams are formed by at least double folding and heat sealing each multilayer laminate film assembly, such that each sealing seam comprises at least three layers of multilayer laminate film assembly material.

* * * * *